US008288039B2

(12) United States Patent
Im et al.

(10) Patent No.: US 8,288,039 B2
(45) Date of Patent: Oct. 16, 2012

(54) ELECTROLYTE SOLVENT FOR IMPROVING SAFETY OF BATTERY AND LITHIUM SECONDARY BATTERY COMPRISING THE SAME

(75) Inventors: Keun Yung Im, Seongnam-si (KR); Ki Young Lee, Daejeon (KR); Joon Sung Bae, Daejeon (KR); Young Taek An, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/424,925

(22) Filed: Mar. 20, 2012

(65) Prior Publication Data

US 2012/0177956 A1 Jul. 12, 2012

Related U.S. Application Data

(62) Division of application No. 10/935,027, filed on Sep. 7, 2004, now Pat. No. 8,158,285.

(30) Foreign Application Priority Data

Sep. 5, 2003 (KR) .................. 10-2003-0062206

(51) Int. Cl.
 *H01M 6/16* (2006.01)
(52) U.S. Cl. ......... 429/336; 429/324; 429/326; 429/329
(58) Field of Classification Search ........................ None
 See application file for complete search history.

(56) References Cited

U.S. PATENT DOCUMENTS

| 5,529,859 A | 6/1996 | Shu et al. |
| 6,210,835 B1 | 4/2001 | Arai |
| 6,406,816 B2 | 6/2002 | Hikmet |
| 6,506,524 B1 | 1/2003 | McMillan et al. |

FOREIGN PATENT DOCUMENTS

| EP | 1463143 A2 | 9/2004 |
| JP | 08-115742 | 5/1996 |
| JP | 10-199567 | 7/1998 |
| JP | 11-242964 | 9/1999 |
| JP | 2004-063432 | 2/2004 |
| WO | 2004-093679 | 11/2004 |

OTHER PUBLICATIONS

Rod McMillian et al., "Florethylene Carbonate Electrolyte and its use in Lithium ion Batteries with Graphite Anodes," 1999, Journal of Power Sources, pp. 20-26.
Minoru Inada et al., "STM Study on Graphite/Electrolyte Interface in Lithium-Ion Batteries: Sold Electrolyte Interface Formation in Trifluoropropylene Carbonate Solution", Electrochimica, 1999, vol. 45, pp. 99-105.
European Supplementary Search Report issued in the corresponding European Patent Application No. 04 774 513.8 on Aug. 28, 2009.

*Primary Examiner* — Cynthia Lee
(74) *Attorney, Agent, or Firm* — Birch, Stewart, Kolasch & Birch, LLP

(57) ABSTRACT

The present invention provides an electrolyte solvent for batteries, which comprises fluoroethylene carbonate and linear ester solvent. Also, the present invention provides a lithium secondary battery comprising a positive electrode, a negative electrode and an electrolyte, wherein the electrolyte comprises fluoroethylene carbonate and linear ester solvent. The inventive electrolyte solvent can improve the battery safety without deteriorating the battery performance.

11 Claims, 3 Drawing Sheets

ELECTROLYTE SOLVENT FOR IMPROVING SAFETY OF BATTERY AND LITHIUM SECONDARY BATTERY COMPRISING THE SAME

CROSS REFERENCE TO RELATED APPLICATIONS

This application is a divisional of U.S. application Ser. 10,935,027, filed on Sep. 7, 2004, which claims priority to Korean Patent Application No. 10-2003-0062206, filed on Sep. 5, 2003, and all the benefits accruing therefrom under 25 U.S.C. 119, the contents of which are herein incorporated by reference in their entirety.

TECHNICAL FIELD

The present invention relates to an electrolyte solvent for improving the safety of batteries and a lithium secondary battery comprising the same.

BACKGROUND ART

As the use of portable devices, such as high-performance notebook computers and mobile phones becomes increasingly popular in all over the world, a demand for high-performance secondary batteries with high energy density is being explosively increased. Particularly, lithium ion secondary batteries are being increasingly applied in most portable electronic products despite their short history, and thus, studies to extend the run-time of portable devices by increasing the capacity of lithium secondary batteries are being actively conducted. However, since an increase in the battery capacity leads to deterioration in the battery safety, there are various attempts to improve the safety of lithium secondary batteries.

Putting together the results of studies conducted up to now on the safety of the lithium secondary batteries, the thermal stability of active material and electrolyte in a charged state has the greatest effect on the battery safety. For this reason, studies to improve the safety of the lithium secondary batteries consist mainly of attempts to develop positive active materials with excellent thermal stability and studies to improve the thermal stability of electrolytes.

At present days, solvents used in electrolytes for the lithium secondary batteries are mainly cyclic and linear carbonates. Such solvents are inflammable and thus, upon either an increase in temperature caused by local short circuits within the batteries or an increase in surrounding temperature, the solvents will easily react with oxygen generated by the structural degradation of an active material, particularly a positive active material, resulting in combustion and explosion. For this reason, imparting flame retardancy to the electrolytes will greatly contribute to the improvement of the battery safety.

Many studies on flame retardant electrolytes which can be used in the lithium secondary batteries have been conducted centering around either solvents containing a compound having a fluorine-for-hydrogen substitution in carbonate or solvents containing phosphorus. Such a solvents have lower flammability and combustibility than those of the prior carbonate or ester solvents, but needs to be used at large amounts in order that electrolyte has sufficient flame retardancy. Also, such a flame retardant solvent shows a lower dissolution of lithium salts than that in the existing cyclic carbonates and contains fluorine or phosphorus with a higher atomic weight than that of hydrogen, resulting in a great increase in the viscosity of electrolytes. Thus, if the volume ratio of this flame retardant solvent in electrolyte solvent increases, the performance of batteries will be greatly deteriorated due to a great reduction in lithium ion conductivity.

Japanese Patent Laid-open Publication No. Hei 10-199567 discloses that if trifluoropropylene carbonate of the following formula 1 is used at the amount of 60-90% by volume relative to the total volume of electrolyte solvent, the safety of batteries can be improved:

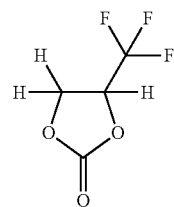

[Formula 1]

However, trifluoropropylene carbonate has about two times higher viscosity than that of ethylene carbonate or propylene carbonate, a generally used solvent. Thus, if it is used at the amount described in the Japanese publication, it will result in a great reduction in the ion conductivity of electrolyte, thus making the deterioration of battery performance inevitable. Moreover, as the trifluoropropylene carbonate is a propylene carbonate substituted with fluorine, it has some of the disadvantages of propylene carbonate. Thus, if it is used in electrolyte solvent, the stability of a coating layer formed at the interface between a graphite negative electrode and an electrolyte will be somewhat insufficient and a problem in the charge/discharge life cycles of the battery will occur, as described in Electrochimica Acta Vol. 45, p. 99, 1999.

U.S. Pat. No. 6,506,524 describes a solvent consisting of fluoroethylene carbonate and propylene carbonate used as electrolyte solvent and the resulting electrolyte-stable protective layer capable of being formed on the surface of a graphite negative electrode material. However, if the solvent of this composition is used as electrolyte solvent, the ion conductivity of electrolyte will be reduced to less than 7 mS/cm, thus deteriorating the performance of batteries, because fluoroethylene carbonate and propylene carbonate have high dielectric constant but undesirably high viscosity.

DISCLOSURE OF THE INVENTION

The present inventors have found that if fluoroethylene carbonate in combination with linear ester solvent is used as an electrolyte solvent for batteries, the safety of the batteries will be improved while the performance of the batteries will not be deteriorated, unlike the prior art.

Accordingly, it is an object of the present invention to provide an electrolyte solvent for batteries, which comprises fluoroethylene carbonate and linear ester solvent, as well as a lithium secondary battery comprising the same.

In one aspect, the present invention provides a battery electrolyte solvent comprising fluoroethylene carbonate and linear ester solvent.

In another aspect, the present invention provides a lithium secondary battery comprising a positive electrode, a negative electrode and an electrolyte, wherein the electrolyte comprises fluoroethylene carbonate and linear ester solvent.

Hereinafter, the present invention will be described in detail.

The present invention provides an electrolyte solvent for batteries, which comprises fluoroethylene carbonate and linear ester solvent.

Fluoroethylene carbonate which can be used in the present invention is selected from the group consisting of monofluoroethylene carbonate (F1EC) represented by the following formula 2, difluoroethylene carbonate represented by the following formula 3 or 4, and a mixture thereof:

[Formula 2]

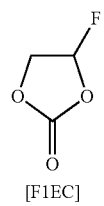

[F1EC]

[Formula 3]

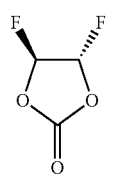

[trans-di-FEC]

[Formula 4]

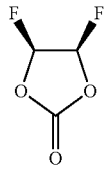

[cis-di-FEC]

Upon the initial charge of a battery, the fluoroethylene carbonate forms a coating layer with high thermal stability on a negative electrode, and upon the exposure of the battery to high temperature, it forms the coating layer on the surface of an electrode active material, so that it inhibits rapid exothermic reaction, thus greatly improving the battery safety. Particularly, it forms a stable coating layer on a negative electrode, unlike nonfluorinated carbonate. For this reason, in lithium secondary batteries, the fluoroethylene carbonate prevents lithium loss caused by the reaction between lithium and electrolyte, and prevents the decomposition of electrolyte since it shows oxidative decomposition only at high voltage. This results in an improvement in storage characteristics of the batteries.

Furthermore, unlike trifluoropropylene carbonate containing at least three fluorine atoms as described in Japanese Patent Laid-open Publication No. Hei 10-199567, the fluoroethylene carbonate contains only one or two fluorine atoms. Thus, it can prevent the problem of an excessive increase in viscosity, which occurs in the case of the use of the compound containing at least three fluorine atoms, thus preventing deterioration in the battery performance. In addition, as known in the art, if the trifluoropropylene carbonate described in the Japanese Patent Publication is used, the stability of a coating layer formed by the trifluoropropylene carbonate will be insufficient and a problem in the charge/discharge life cycles of batteries will arise, due to the shortcomings of propylene carbonate itself. On the contrary, the fluoroethylene carbonate used in the present invention does not cause such problems.

By using a linear ester compound together with the fluoroethylene carbonate, the present invention can not only improve the battery safety but also prevent deterioration in the battery performance, unlike the prior art. Concrete descriptions are as follows.

Table 1 below shows the physical properties of fluoroethylene carbonate (F1EC, F2EC), trifluoropropylene carbonate (TFPC), ethylene carbonate (EC), propylene carbonate (PC), dimethyl carbonate (DMC), ethyl methyl carbonate (EMC), diethyl carbonate (DEC), ethylene acetate (EA) and methyl propionate (MP), which are known as electrolyte solvents in the prior art.

TABLE 1

Physical properties of electrolyte solvents

| Solvent | Viscosity (ambient temperature) | Dielectric constant | Molecular weight |
| --- | --- | --- | --- |
| F1EC | 4.1 | 78.4 | 106.1 |
| trans-F2EC | 2.5 | 37.1 | 124.0 |
| TFPC | 5.0 | 62.0 | 156.0 |
| EC | 2.5 | 89 | 88.1 |
| PC | 2.53 | 65 | 102.1 |
| DMC | 0.59 | 3.1 | 90.1 |
| EMC | 0.65 | 3.0 | 104.1 |
| DEC | 0.75 | 2.8 | 118.1 |
| EA | 0.44 | 6.0 | 88.11 |
| MP | 0.43 | 6.2 | 88.11 |

As shown in Table 1, fluoroethylene carbonate (F1EC or F2EC) has a very high viscosity. Thus, if it is used alone, it will result in deterioration in the battery performance.

Furthermore, cyclic carbonates (EC and PC) have a higher viscosity than that of linear carbonates (DMC, EMC, DEC, EA and MP). Thus, even when the fluoroethylene carbonate in combination with the cyclic carbonate is used as electrolyte solvent, it will deteriorate the battery performance. For example, U.S. Pat. No. 6,506,524 discloses the use of fluoroethylene carbonate in combination with cyclic propylene carbonate, in which case the battery performance will be deteriorated due to a reduction in ion conductivity.

Trifluoropropylene carbonate (TFPC) used in Japanese Patent Laid-open Publication No. Hei 10-199567 has a much higher viscosity than that of fluoroethylene carbonate (F1EC or F2EC). Thus, if it is used in combination with linear carbonate solvent, it will be difficult to prevent deterioration in the battery performance.

Accordingly, in the present invention, fluoroethylene carbonate in combination with linear ester solvent is used as an electrolyte solvent for batteries. This can improve the battery safety without deteriorating the battery performance.

Meanwhile, Japanese Patent Laid-open Publication No. Hei 8-115742 shows an example of the use of chloroethylene carbonate and linear carbonate as electrolyte solvent. However, as described in Journal of Power Sources, 81-82 (1999), p. 20, if chloroethylene carbonate (C1EC) in combination with linear carbonate is used as electrolyte solvent, lithium chloride (LiCl) is formed by the reductive decomposition of chloroethylene carbonate (C1EC) on a negative electrode. The formed lithium chloride (LiCl) moves to a positive electrode to form chlorine ($Cl_2$) which, in turn, moves to the negative electrode to a chloride anion ($Cl^-$). Since this reaction is repeated, the use of chloroethylene carbonate in combination with linear carbonate as electrolyte solvent adversely affects the battery performance.

On the other hand, lithium fluoride (LiF) formed by the reaction of fluoroethylene carbonate (F1EC) which is used as one component of the inventive electrolyte solvent has a lower solubility than that of lithium chloride, indicating a reduction in the repeated reactions as described above. Thus, the inventive electrolyte solvent shows a reduction in the deterioration of the battery performance as compared to the case where chloroethylene carbonate in combination with linear carbonate is used as electrolyte solvent.

In short, in the present invention, fluoroethylene carbonate in combination with linear ester solvent is used as electrolyte solvent unlike the above-mentioned US Patent and Japanese Patent Publication, thus improving the battery safety without deteriorating the battery performance.

The linear ester solvents which can be used in the present invention include ester (R—COO—R') solvents and carbonate (R—OCOO—R') solvents. Concrete examples thereof include, but art not limited to, ethyl methyl carbonate, dimethyl carbonate, diethyl carbonate, ethyl acetate, methyl propionate, and a mixture of two or more thereof.

The inventive electrolyte solvent for batteries preferably contains fluoroethylene carbonate at the amount of 20-60% by volume, based on the total volume of the electrolyte solvent. If the fluoroethylene carbonate is contained at the amount of less than 20% by volume, it cannot provide sufficient safety and storage characteristics of batteries, and if it is contained at the amount of more than 60% by volume, it can adversely affect the battery performance. Meanwhile, the linear ester solvent is preferably contained at the amount of 40-80% by volume, based on the total volume of the electrolyte solvent.

In another aspect, the present invention provides a lithium secondary battery comprising a positive electrode, a negative electrode and an electrolyte, wherein the electrolyte comprises the inventive electrolyte solvent and lithium salts.

The inventive lithium secondary battery can be fabricated using the same material and method as known in the art except that the inventive electrolyte solvent is used. For example, the inventive lithium secondary battery can be fabricated by interposing a porous separator between a positive electrode and a negative electrode by a conventional method so as to produce an electrode structure, placing the electrode structure into a battery case, and injecting the inventive non-aqueous electrolyte into the resulting battery case.

Examples of the lithium salts which can be used in the present invention include, but are not limited to, lithium hexafluorophosphate ($LiPF_6$), lithium tetrafluoroborate ($LiBF_4$), lithium bis(trifluoromethanesulfonyl)imide ($LiN(CF_3SO_2)_2$), lithium bis(perfluoroethylsulfonyl)imide ($LiN(C_2F_5SO_2)_2$), lithium tris(trifluoromethanesulfonyl)methide ($LiC(CF_3SO_2)_3$), lithium triflate ($LiCF_3SO_3$), lithium bisoxalatoborate ($LiC_4BO_8$) and a mixture of two or more thereof.

The inventive electrolyte preferably has an ion conductivity of more than 7 mS/cm, and more preferably more than 8 mS/cm, at ambient temperature. At an ion conductivity of less than 7 mS/cm, the movement of ions in the electrolyte will be slow, thus deteriorating the battery performance.

In the present invention, active materials for the positive electrode include lithium-transition metal composite oxides. Non-limited examples thereof include $LiCoO_2$, $LiNiO_2$, $LiMn_2O_4$, $LiMnO_2$, and $LiNi_{1-x}Co_xM_yO_2$ (M=Al, Ti, Mg or Zr, $0<X\leq1$, $0\leq Y\leq0.2$), $LiNi_xCo_yMn_{1-x-y}O_2$ ($0<X\leq0.5$, $0<Y\leq0.5$), $LiM_xM'_yMn_{(2-x-y)}O_4$ (M, M'=V, Cr, Fe, Co, Ni or Cu, $0<X\leq1$, $0<Y\leq1$), $LiCoPO_4$, and etc.

In the present invention, materials for the negative electrode include materials capable of absorbing, storing and releasing lithium, and non-limited examples thereof include carbon, silicon and tin compounds, which can absorb, store and release lithium.

By the electrolyte solvent comprising fluoroethylene carbonate and linear ester solvent, the inventive lithium secondary battery has improved safety without deterioration in the battery performance.

BEST MODE FOR CARRYING OUT THE INVENTION

The present invention will hereinafter be described in further detail by examples. It is to be understood, however, that the present invention is not limited to or by the examples.

EXAMPLES

Preparation of Electrolyte and Measurement of Ion Conductivity

Examples 1 to 7 and Comparative Example 1 and 2

Monofluoroethylene carbonate (F1EC) and ethyl methyl carbonate were mixed with each other at volume ratios given in Table 2 below so as to prepare solvents. Lithium hexafluorophosphate ($LiPF_6$) salts were dissolved in each of the prepared solvent to a concentration of 0.8-1.2 M so as to prepare electrolytes. The electrolytes were measured for ion conductivity at ambient temperature using Metrohm 712 conductometer.

Examples 8 to 12

The preparation of electrolytes and the measurement of ion conductivity were performed in the same manner as in Examples 1-7 except that dimethyl carbonate (DMC) in place of ethyl methyl carbonate was used at volume ratios given in Table 2.

Comparative Examples 3 and 4

The preparation of electrolytes and the measurement of ion conductivity were performed in the same manner as in Examples 1-7 except that ethylene carbonate and ethyl methyl carbonate or dimethyl carbonate were used at volume ratios given in Table 2 without using fluoroethylene carbonate.

Comparative Examples 5 and 6

The preparation of electrolytes and the measurement of ion conductivity were performed in the same manner as in Examples 1-7 except that fluoroethylene carbonate, ethylene carbonate and ethyl methyl carbonate were used at volume ratios given in Table 2.

Comparative Example 7

The preparation of an electrolyte and the measurement of ion conductivity were performed in the same manner as in Examples 1-7 except that fluoroethylene carbonate and propylene carbonate were used at volume ratios given in Table 2.

Fabrication of Batteries

Figure 1:
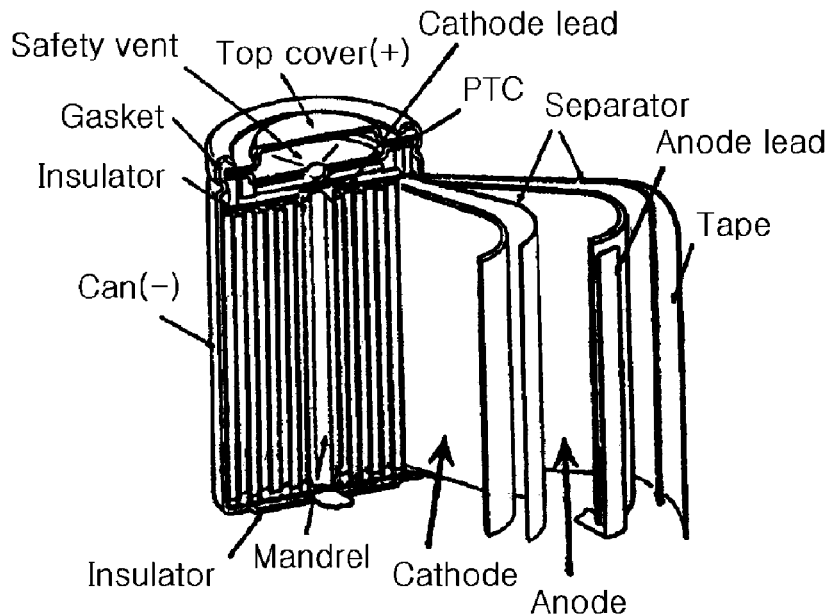
FIG. 1 illustrates the structure of a general cylindrical batter.
Figure 2:
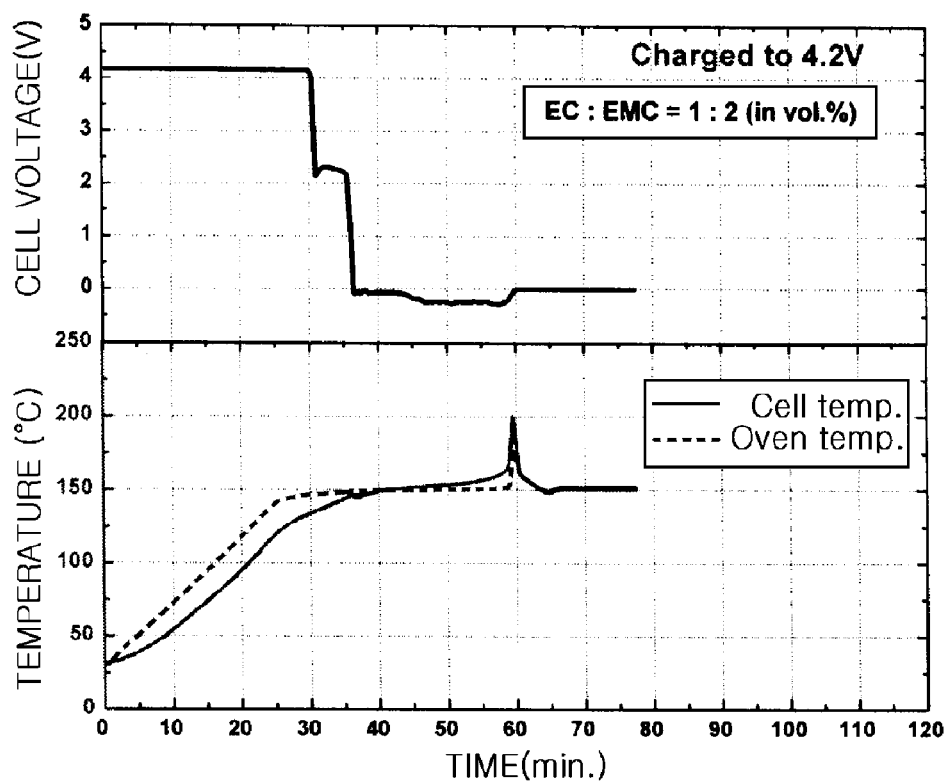
FIGS. 2 and 3 are graphic diagrams showing the results of hot-box tests in a fully charged state (4.2 V) on batteries fabricated in Comparative Example 3 and Example 2, respectively.
Figure 3:
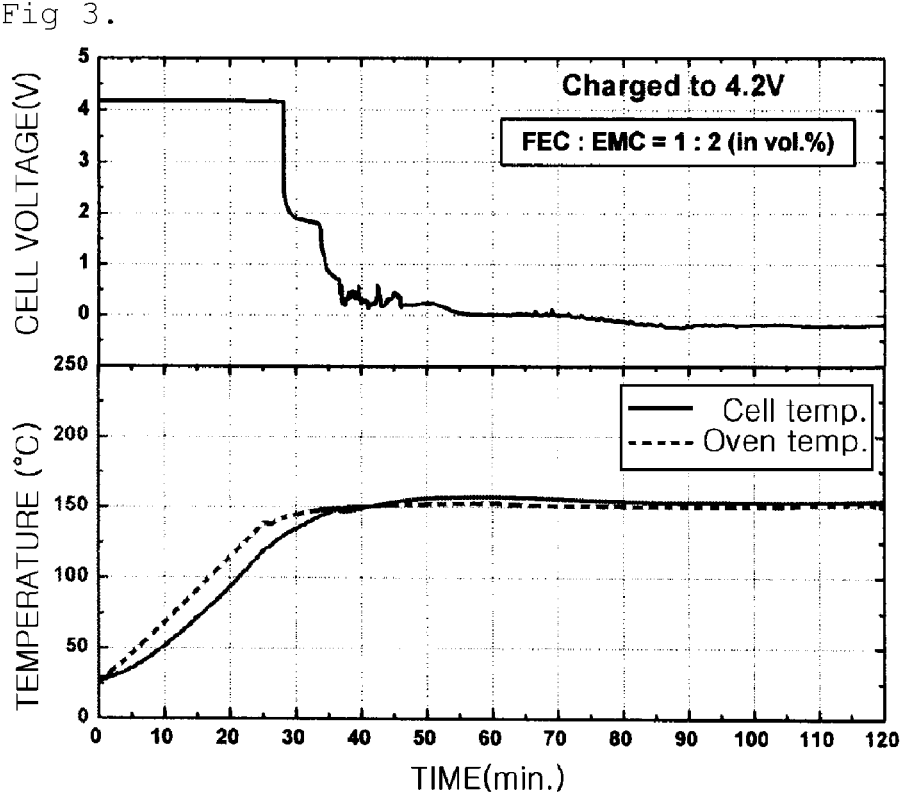

In order to evaluate the performance and safety of batteries, lithium secondary batteries having a structure shown in FIG. 1 were fabricated using the electrolytes prepared in Examples 1-12 and Comparative Examples 1-7. Specifically, a negative electrode formed of a negative electrode current collector (Cu foil) coated with carbon as a negative active material, a positive electrode formed of a positive electrode current collector (Al foil) coated with $LiCoO_2$ as a positive active material, and a porous polyolefin separator, were wound several times around a cylindrical jelly roll. Then, after an insulator was placed on the upper and lower ends of the cylindrical jelly roll, the resulting cylindrical jelly roll was placed into a cylindrical battery can with a diameter of 18 mm and a height of 65 mm. Next, the prepared electrolyte was injected into the resulting battery can, thus fabricating a battery.

Performance Evaluation

The discharge characteristic of the batteries was evaluated by the ratio of capacity upon discharge at a current of 1 C to capacity upon discharge at 0.2 C. The results are shown in Table 3 below.

Safety Evaluation

The batteries with a diameter of 18 mm and a height of 65 mm were full-charged to 4.2 V or over-charged to 4.35 V, and then placed in a hot air oven in which they were heated to 150° C. at a rate of 5° C./min. While the batteries are maintained in the oven at that temperature, time to the thermal explosion of the batteries, representing the thermal stability of the batteries under these conditions, was measured. The results are shown in Table 3 and FIGS. 2 to 5.

TABLE 2

Composition of electrolyte solvent

| | $LiPF_6$ (Molar concentration) | FIEC (vol %) | EC (vol %) | PC (vol %) | EMC (vol %) | DMC (vol %) |
|---|---|---|---|---|---|---|
| Example 1 | 0.8 | 25 | | | 75 | |
| Example 2 | 0.8 | 33 | | | 67 | |
| Example 3 | 0.8 | 40 | | | 60 | |
| Example 4 | 0.8 | 50 | | | 50 | |
| Example 5 | 0.8 | 60 | | | 40 | |
| Example 6 | 1.0 | 33 | | | 67 | |
| Example 7 | 1.2 | 33 | | | 67 | |
| Example 8 | 0.8 | 25 | | | | 75 |
| Example 9 | 0.8 | 33 | | | | 67 |
| Example 10 | 0.8 | 40 | | | | 60 |
| Example 11 | 0.8 | 50 | | | | 50 |
| Example 12 | 0.8 | 60 | | | | 40 |
| Comp. Ex. 1 | 0.8 | 10 | | | 90 | |
| Comp. Ex. 2 | 0.8 | 70 | | | 30 | |
| Comp. Ex. 3 | 0.8 | | 33 | | 67 | |
| Comp. Ex. 4 | 0.8 | | 33 | | | 67 |
| Comp. Ex. 5 | 0.8 | 23 | 10 | | 67 | |
| Comp. Ex. 6 | 0.8 | 13 | 20 | | 67 | |
| Comp. Ex. 7 | 0.8 | 50 | | 50 | | |

TABLE 3

Test results on battery performance and safety

| | Ion conductivity at ambient temperature (mS/cm) | Discharge characteristic % (capacity at 1 C/capacity at 0.2 C) | Charged voltage | Thermal stability (Time maintained at 150° C.) |
|---|---|---|---|---|
| Example 1 | 8.24 | 97.5 | 4.2 | Over 90 min |
| Example 2 | 8.40 | 94.6 | 4.2 | Over 90 min |
| Example 3 | 8.60 | 96.1 | 4.2 | Over 90 min |
| Example 4 | 7.95 | 96.2 | 4.2 | Over 90 min |
| Example 5 | 7.56 | 93.5 | 4.2 | Over 90 min |
| Example 6 | 8.88 | 97.5 | 4.2 | Over 90 min |
| Example 7 | 8.47 | 97.7 | 4.2 | 32 min |
| Example 8 | 10.5 | 98.1 | 4.2 | Over 90 min |
| Example 9 | 10.6 | 98.2 | 4.2 | Over 90 min |
| Example 10 | 9.9 | 97.6 | 4.2 | Over 90 min |
| Example 11 | 9.5 | 97.5 | 4.2 | Over 90 min |
| Example 12 | 8.7 | 96.3 | 4.2 | Over 90 min |
| Comp. Ex. 1 | 6.25 | 94.3 | 4.2 | Over 90 min |
| Comp. Ex. 2 | 7.04 | 95.5 | 4.2 | Over 90 min |
| Comp. Ex. 3 | 8.9 | 96.5 | 4.2 | 60 min |
| Comp. Ex. 4 | 11.8 | 98.1 | 4.2 | 25 min |
| Comp. Ex. 5 | 8.41 | 97.1 | 4.2 | 60 min |
| Comp. Ex. 6 | 8.56 | 97.0 | 4.2 | 30 min |
| Comp. Ex. 7 | 5.8 | —* | 4.2 | —* |

—*: Not measurable since electrode was not impregnated due to a high viscosity of electrolyte.

As evident from Table 3 above, the batteries of Examples, which contain fluoroethylene carbonate in combination with linear ester solvent as the electrolyte solvent, were excellent in all ion conductivity and safety.

However, the batteries of Comparative Examples 3 and 4, which contain no fluoroethylene carbonate, showed a significantly lower safety than that of the batteries fabricated in Examples 1-12. Furthermore, the batteries of Comparative Examples 5 and 6, which contain a relatively small amount of fluoroethylene carbonate while containing cyclic carbonate, showed an inferior safety to the batteries of Examples 1-12. Moreover, in the battery of Comparative Example 7, which contains fluoroethylene carbonate and propylene carbonate (cyclic carbonate) without using the linear ester solvent, the discharge characteristic and safety of the battery could not be measured since the electrode was not impregnated with the electrolyte due to a high viscosity of the electrolyte.

Figure 4:
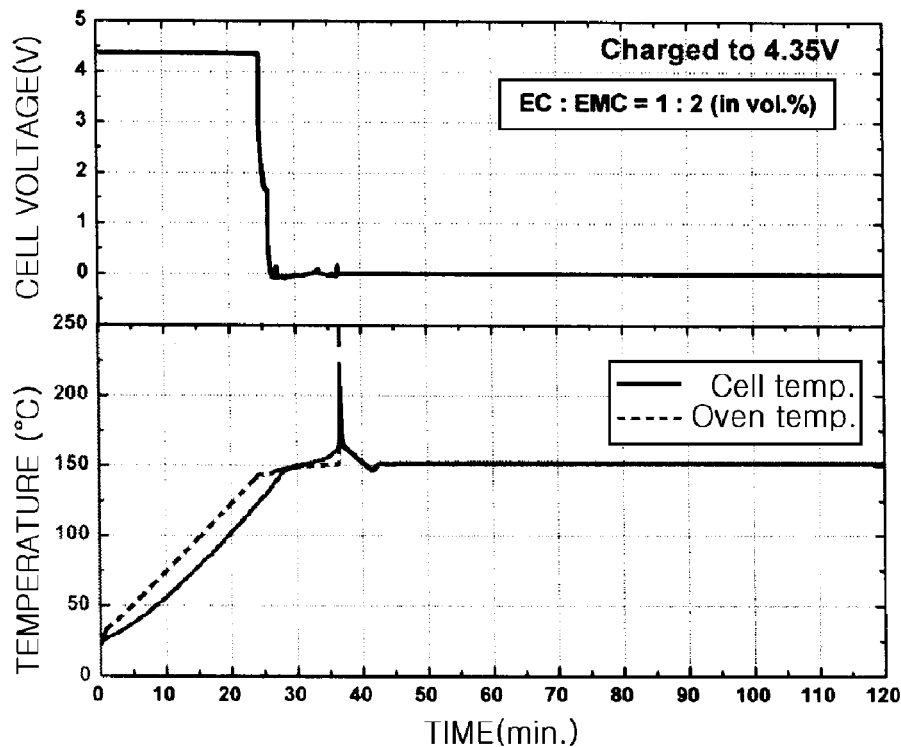
FIGS. 4 and 5 are graphic diagrams showing the results of hot-box tests in a overcharged state (4.35 V) on batteries fabricated in Comparative Example 3 and Example 2, respectively.
Figure 5:
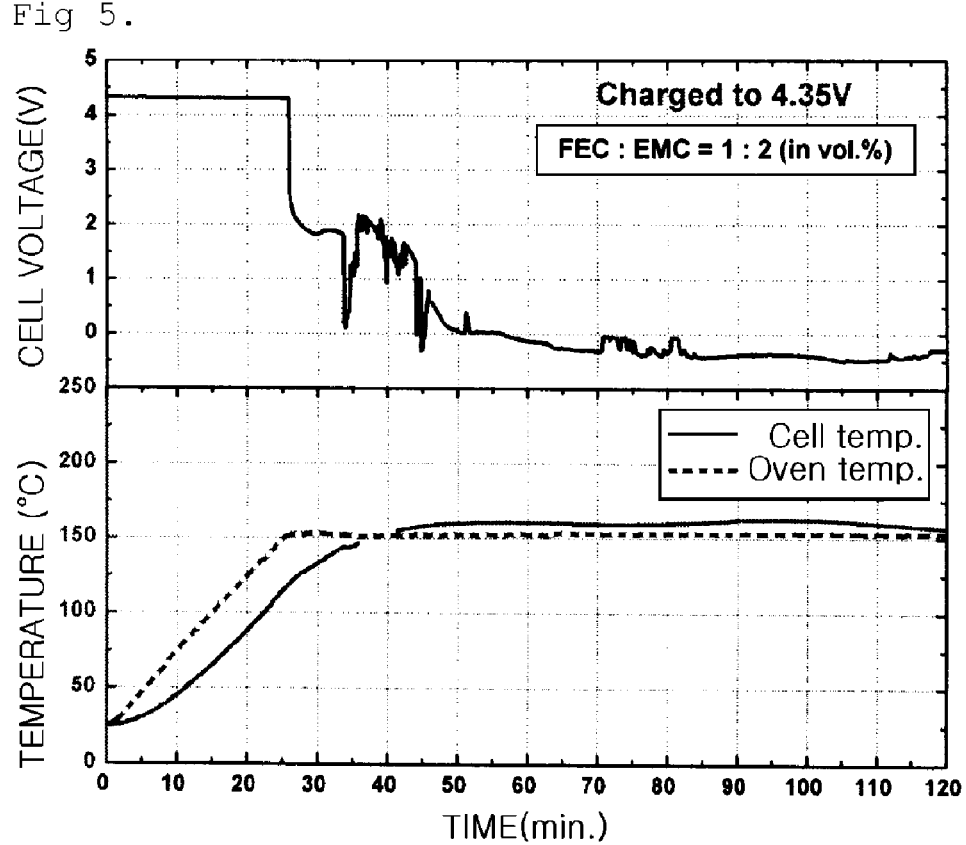

Meanwhile, FIGS. 4 and 5 show the results of safety tests on the batteries overcharged to 4.35 V. As shown in FIGS. 4 and 5, the battery fabricated in Comparative Example 7 could not be maintained in the oven at 150° C. even for 38 minutes (FIG. 4), whereas the battery fabricated in Example 2 maintained its safety in the oven at 150° C. over 2 hours (FIG. 5).

INDUSTRIAL APPLICABILITY

As can be seen from the foregoing, according to the present invention provides, fluoroethylene carbonate in combination with linear ester is used as an electrolyte solvent for batteries. This can improve the battery safety while preventing deterioration in the battery performance.

The invention claimed is:
1. A method of preventing thermal explosions in a lithium secondary battery, comprising combining
an electrolyte solvent comprising
a lithium salt,
20-60% by volume of fluoroethylene carbonate, and
40-80% by volume of linear ester,
the amounts of fluoroethylene carbonate and linear ester solvent being based on the total volume of the electrolyte solvent, with a positive electrode, and
a negative electrode,
to form the lithium secondary battery, and charging the battery at up to 4.35 V,
wherein the lithium secondary battery containing the electrolyte is able to withstand a temperature of 150° C. for up to 120 minutes without a thermal explosion.

2. The method of claim 1, wherein the electrolyte has a conductivity of 7.56 mS/cm or more.

3. The method of claim 1, wherein the battery is charged at up to 4.2V.

4. The method of claim 3, wherein the lithium secondary battery containing the electrolyte is able to withstand a temperature of 150° C. for more than 90 minutes without a thermal explosion.

5. The method of claim 1, wherein the fluoroethylene carbonate solvent is selected from the group consisting of monofluoroethylene carbonate, difluoroethylene carbonate and a mixture thereof.

6. The method of claim 1, wherein the linear ester solvent is selected from the group consisting of ethyl methyl carbonate, dimethyl carbonate, diethyl carbonate, ethyl acetate, methyl propionate, and a mixture of two or more thereof.

7. The method of claim 1, wherein the lithium salt comprises lithium hexafluorophosphate ($LiPF_6$), lithium tetrafluoroborate ($LiBF_4$), lithium bis(trifluoromethanesulfonyl)imide ($LiN(CF_3SO_2)_2$), lithium bis(perfluoroethylsulfonyl)imide ($LiN(C_2F_5SO_2)_2$), lithium tris(trifluoromethanesulfonyl)methide ($LiC(CF_3SO_2)_3$), lithium triflate ($LiCF_3SO_3$), lithium bisoxalatoborate ($LiC_4BO_8$) and a mixture of two or more thereof.

8. The method of claim 1, wherein the positive electrode comprises active materials including $LiCoO_2$; $LiNiO_2$; $LiMn_2O_4$; $LiMnO_2$; $LiNi_{1-X}Co_XM_YO_2$ where M=Al, Ti, Mg or Zr, $0<X\leq1$, and $0\leq Y\leq0.2$; $LiNi_XCo_YMn_{1-X-Y}O_2$ where $0<X\leq0.5$, and $0<Y\leq0.5$; $LiM_XM'_YMn_{(2-x-y)}O_4$ where M, M'=V, Cr, Fe, Co, Ni or Cu, and $0<X\leq1$, $0<Y\leq1$); or $LiCoPO_4$.

9. The method of claim 1, wherein the negative electrode includes materials which absorb, store, and release lithium, and where the negative electrode materials include carbon, silicon, and tin compounds.

10. A method of preventing thermal explosions in a lithium secondary battery, comprising
combining
an electrolyte solvent comprising
a lithium salt,
20-60% by volume of a fluoroethylene carbonate selected from the group consisting of mono fluoroethylene carbonate, difluoroethylene carbonate and a mixture thereof, and
40-80% by volume of a linear ester selected from the group consisting of ethyl methyl carbonate, dimethyl carbonate, diethyl carbonate, ethyl acetate, methyl propionate, and a mixture of two or more thereof,
the amounts of fluoroethylene carbonate and linear ester solvent being based on the total volume of the electrolyte solvent, with
a positive electrode, and
a negative electrode,
to form the lithium secondary battery, and
charging the battery at up to 4.35 V,
wherein the lithium secondary battery containing the electrolyte is able to withstand a temperature of 150° C. for up to 120 minutes without a thermal explosion.

11. A method of preparing a lithium secondary battery, comprising
combining
an electrolyte solvent comprising
a lithium salt,
20-60% by volume of fluoroethylene carbonate, and
40-80% by volume of linear ester,
the amounts of fluoroethylene carbonate and linear ester solvent being based on the total volume of the electrolyte solvent, with
a positive electrode, and
a negative electrode,
to form the lithium secondary battery, and
charging the battery at up to 4.35 V,
wherein the lithium secondary battery containing the electrolyte is able to withstand a temperature of 150° C. for up to 120 minutes without a thermal explosion.

* * * * *